(12) United States Patent
Mizui et al.

(10) Patent No.: US 9,266,467 B2
(45) Date of Patent: *Feb. 23, 2016

(54) STOP LAMP LIGHTING CONTROL DEVICE FOR ELECTRIC VEHICLE

(71) Applicant: MITSUBISHI JIDOSHA KOGYO KABUSHIKI KAISHA, Tokyo (JP)

(72) Inventors: Toshifumi Mizui, Nagoya (JP); Toshiyuki Matsumi, Nagoya (JP); Hiroaki Miyamoto, Okazaki (JP); Hideaki Taniguchi, Okazaki (JP); Takanori Sugimoto, Tsushima (JP); Yasuyuki Hatsuda, Okazaki (JP); Akira Hashizaka, Okazaki (JP); Masato Nishida, Nagoya (JP); Sosuke Nanbu, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,808

(22) Filed: Dec. 24, 2014

(65) Prior Publication Data
US 2015/0175062 A1 Jun. 25, 2015

(30) Foreign Application Priority Data
Dec. 25, 2013 (JP) .................. 2013-267204

(51) Int. Cl.
*B60Q 1/44* (2006.01)
*B60T 8/64* (2006.01)
*H02P 3/14* (2006.01)

(52) U.S. Cl.
CPC *B60Q 1/444* (2013.01); *B60Q 1/44* (2013.01); *H02P 3/14* (2013.01)

(58) Field of Classification Search
CPC ............ B60Q 1/44; B60Q 1/444; B60T 8/64; B60T 13/66; B60T 13/68; B60L 7/18; G06F 19/00; G08G 1/166
USPC ............ 315/76, 77, 79; 701/8, 70, 74, 84, 90; 303/121, 141, 152, 154
See application file for complete search history.

(56) References Cited

U.S. PATENT DOCUMENTS

| | | | |
|---|---|---|---|
| 6,208,929 B1 * | 3/2001 | Matsuno et al. ................. | 701/89 |
| 6,246,944 B1 * | 6/2001 | Maruyama ....................... | 701/70 |
| 2012/0100958 A1 * | 4/2012 | Oue et al. ........................ | 477/21 |

FOREIGN PATENT DOCUMENTS

| | | |
|---|---|---|
| DE | 102008055898 A1 | 5/2010 |
| EP | 2907698 A1 | 8/2015 |
| JP | 2012-153294 A | 8/2012 |
| WO | WO 2014/057911 A1 | 4/2014 |

OTHER PUBLICATIONS

European Search Report, mailed Jun. 24, 2015, in corresponding European Patent Application No. 14200319.3.

* cited by examiner

*Primary Examiner* — Thai Pham
(74) *Attorney, Agent, or Firm* — Birch, Stewart, Kolasch & Birch, LLP

(57) ABSTRACT

A stop lamp lighting control device for an electric vehicle having an electric regenerative braking system includes a calculation unit that converts a first deceleration threshold value for turning on a stop lamp or a second deceleration threshold value for turning off the stop lamp to a first regenerative torque threshold value for turning-on the stop lamp or a second regenerative torque threshold value for turning-off the stop lamp by calculation assumed that a weight of the vehicle is a curb weight or a gross vehicle weight, and a determination unit that performs a comparison between a regenerative torque value generated by the electric regenerative braking system and the first regenerative torque threshold value or the second regenerative torque threshold value and controls the stop lamp to be turned on or turned off based on the comparison result.

4 Claims, 6 Drawing Sheets

STOP LAMP LIGHTING CONTROL DEVICE FOR ELECTRIC VEHICLE

CROSS REFERENCE TO RELATED APPLICATION

This application is based on Japanese Patent Application No. 2011-26704 filed on Dec. 25, 2013, the contents of which are incorporated herein by reference.

BACKGROUND

1. Technical Field

The present invention relates to a stop lamp lighting control device for an electric vehicle having an electric regenerative braking system which controls stop lamps of the electric vehicle to be suitably turned on or off.

2. Related Art

In electric vehicles, such as electric vehicle, hybrid vehicles, or plug-in hybrid vehicles, an electromotor (motor) is used as a driving source. In such electric vehicles, one is known in which an electric regenerative braking system is provided as an assistant brake.

The electric regenerative braking system is configured so that when a driver stops operating an accelerator pedal and thus an accelerator opening degree becomes a frilly closed state, circuit switching is performed so that the motor is rotated by a driving force of wheels and thus severs as a generator, thereby generating a braking force (e.g., see JP-A-2012-153294). As electric power generated by regenerative braking is charged to a battery.

According to the pre-revised regulation notified from the Ministry of Land, Infrastructure and Transport of Japan, when the electric regenerative braking system, which is adapted to be activated as an accelerator operation device is released, is being operated, turn-on of brake lamps and the like is prohibited even at any deceleration.

However, the regulation is revised so that turn-on of brake lamps and the like is obligated when a deceleration exceeds a predetermined specific value.

Relationships between decelerations and turn-on requirements are as follows:

(1) If the deceleration is $-0.7$ m/s$^2$ or less: turn-on prohibition (2) If the deceleration exceeds $-0.7$ m/s$^2$ and $-1.3$ m/s$^2$ or less: optionally turn-on (3) If the deceleration exceeds $-1.3$ m/s$^2$: obligatory turn-on The revised regulation is applied to automobiles which are newly subjected to designation of type or the like since Jan. 30, 2014.

FIG. 3 shows the revised regulation, in which a horizontal axis represents vehicle speeds and a vertical axis represents decelerations. In FIG. 3, a 'second deceleration threshold value for turning off the stop lamp' corresponds to '$-0.7$ m/s$^2$' and a 'first deceleration threshold value for turning on the stop lamp' corresponds to '$-1.3$ m/s$^2$'.

Herein, a minus sign '$-$' is assigned to values of decelerations, and when magnitudes of decelerations are compared, a deceleration having a higher absolute value is referred to as a higher deceleration. For example, a deceleration of 1.3 m/s$^2$ is referred to as a higher deceleration, as compared to a deceleration of $-0.7$ m/s$^2$ Correspondingly, for regenerative torques as described below, a minus sign '$-$' is assigned to values of regenerative torques, and when magnitudes of regenerative torques are compared, a regenerative torque having a higher absolute value is referred to as a higher regenerative torque. For example, a regenerative torque of $-60$ Nm is referred to as a higher regenerative torque, as compared to a regenerative torque of $-20$ Nm.

A weight of a vehicle greatly influences a deceleration of the vehicle. Accordingly, what is required is to perform suitable turn-on or turn-off control to conform to the revised regulation (see FIG. 3) while considering a weight of a vehicle.

The present invention has been made keeping in mind the above problems, and an object thereof is to provide a stop lamp lighting control device for an electric vehicle, in which turn-on or turn off control of brake lamps stop lamps) can be performed to suitably alert sufficient attention to a succeeding vehicle while observing the revised regulation.

SUMMARY OF THE INVENTION (1) In order to solve the above matter, a stop lamp lighting control device for an electric vehicle having an electric regenerative braking system includes a calculation unit that converts a previously-defined first deceleration threshold value for turning on a stop lamp or a previously-defined second deceleration threshold value for turning off the stop lamp to a first regenerative torque threshold value for turning-on the stop lamp or a second regenerative torque threshold value for turning-off the stop lamp at each vehicle speed by calculation assumed that a weight of the electric, vehicle is a curb weight or a gross vehicle weight, and a determination unit that performs a comparison between a regenerative torque value generated by the electric regenerative braking system during a regenerative braking and the first regenerative torque threshold value or the second regenerative torque threshold value at each vehicle speed and controls the stop lamp to be turned on or turned off based on the comparison result.

(2) In the stop lamp lighting control device of (1), the calculation unit includes a first calculation unit that converts the first deceleration threshold value to the first regenerative torque threshold value at each vehicle speed by calculation assumed that the weight of the electric vehicle is the curb weight, and a second calculation unit that converts the second deceleration threshold value to the second regenerative torque threshold value at each vehicle speed by calculation assumed that the weight of the electric vehicle is the gross vehicle weight. The determination unit controls the stop lamp to be turned on when the regenerative torque value is larger than the first regenerative torque threshold value, and the determination unit controls the stop lamp to be turned off when the regenerative torque value is equal to or smaller than the stop lamp turn-off regenerative torque threshold value.

(3) In the stop lamp lighting control device of (1) or (2), the determination unit is configured to keep the stop lamp turned on when the regenerative torque value is changed to be equal to or smaller than the first regenerative torque threshold value while the stop lamp is at a turned on state, and to keep the stop lamp turned off when the regenerative torque value is changed to exceed the second regenerative torque threshold value while the stop lamp is at a turned off state.

According to the present invention, the first regenerative torque threshold value corresponding to the first deceleration threshold value is calculated using the curb weight, the second regenerative torque threshold value corresponding to the second deceleration threshold value is calculated using the gross vehicle weight. Also the stop lamp is turned on when the regenerative torque value exceeds the first regenerative torque threshold value, and the stop lamp is turned off when the regenerative torque value is equal to or smaller than the second regenerative torque threshold value. Accordingly, turn-on or turn off control of the stop lamp can be performed to suitably alert a sufficient attention to a succeeding vehicle while observing the revised regulation with a weight of a vehicle from a cub weight to a gross vehicle weight.

DESCRIPTION OF PREFERRED EMBODIMENT

A stop lamp lighting control device for an electric vehicle according to the present invention will be now described in detail on the basis of embodiments.

In the following embodiments, although an electric vehicle having an electric regenerative braking system will be illustrated, the present invention can be applied to a hybrid vehicle or a plug-in hybrid vehicle having such an electric regenerative braking system.

A control principle will be first described and then specific embodiments employing the control principle will be described.

<Control Principle of Embodiment>

First, a control principle according to the present embodiment will be described.

Figure 3:
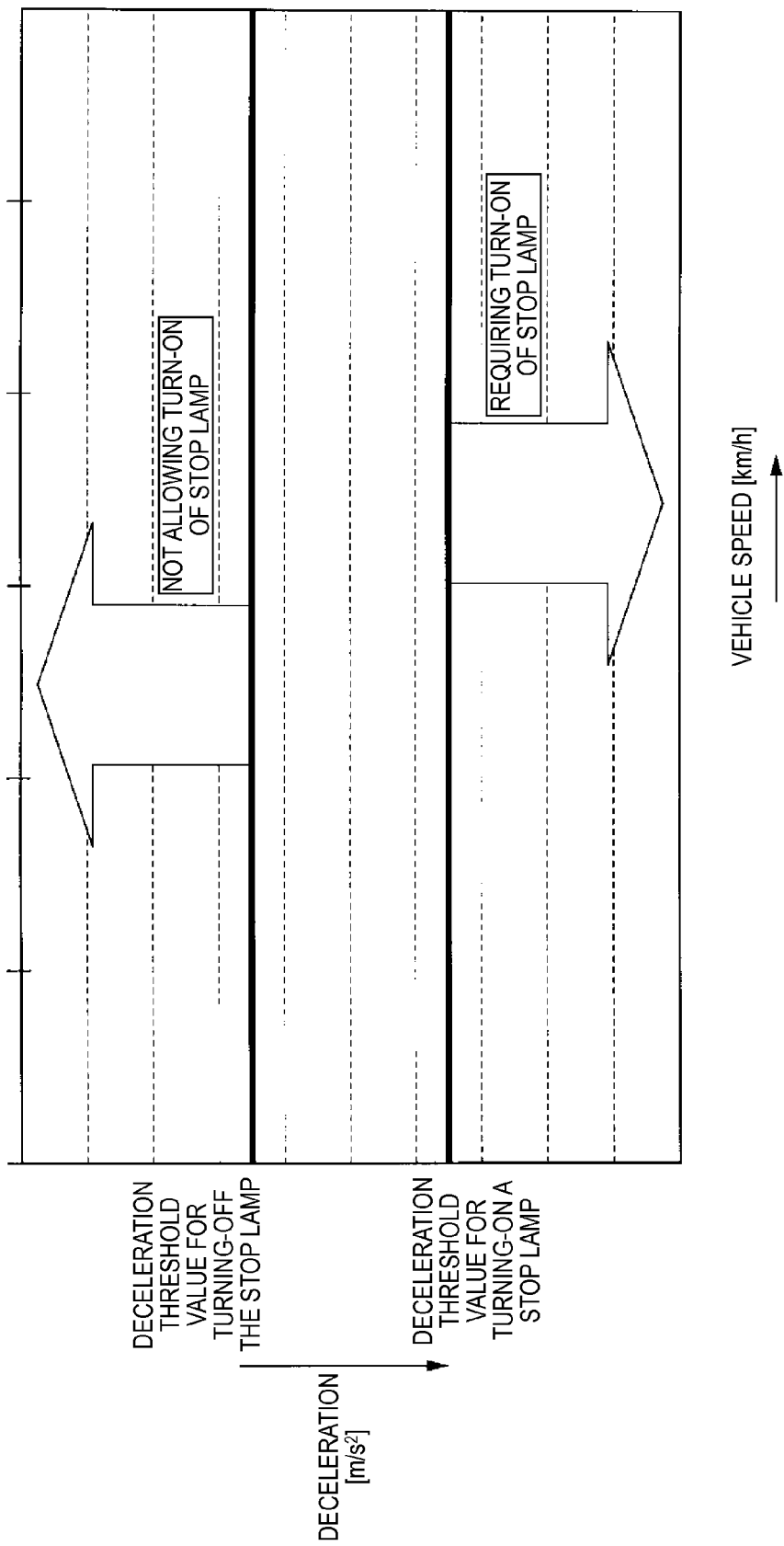
FIG. 3 is a characteristic diagram showing the notified regulation with a horizontal axis representing vehicle speeds and a vertical axis representing decelerations.

When attempting to control a stop lamp to be turned on or turned off based on a data map of FIG. 3 showing a revised regulation, regardless of vehicle speeds, the stop lamp is turned on if a deceleration exceeds $-1.3$ m/s$^2$, whereas the stop lamp is turned off if the deceleration is equal to or smaller than $-0.7$ m/s$^2$.

Herein, the deceleration of $-1.3$ m/s$^2$, which is a threshold value for turning on the stop lamp (threshold value defined by the regulation), is referred to as a 'first deceleration threshold value for turning on the stop lamp', and the deceleration of $-0.7$ m/s$^2$, which is a threshold value for turning off the stop lamp (threshold value defined by the regulation), is referred to as a 'second deceleration threshold value for turning off the stop lamp'.

In the present embodiment, a 'first regenerative torque threshold value for turning-on the stop lamp', which is a regenerative torque value corresponding to the 'first deceleration threshold value' at each vehicle speed during running, is calculated and also a 'second regenerative torque threshold value for turning-off the stop lamp', which is a regenerative torque value corresponding to the 'second deceleration threshold value' is calculated.

Further, a vehicle speed and a regenerative torque during running are obtained, and the stop lamp is controlled to be turned on if the regenerative torque at the vehicle speed exceeds the first regenerative torque threshold value at the vehicle speed, and to be turned off if the regenerative torque at the vehicle speed is equal to or smaller than the second regenerative torque threshold value at the vehicle speed.

In other words, according to the embodiment, as a determination criterion for turn-on or turn-off control, regenerative torque values, instead of deceleration values, are employed to control the stop lamp to be turned on or off.

As well blown, a deceleration caused by the electric regenerative braking system of the electric vehicle is determined by a regenerative torque, a vehicle speed, a running resistance coefficient, a vehicle weight, a gear ratio between a motor, which drives the electric vehicle, and drive wheels, and a wheel radius. Thus, if a deceleration, a vehicle speed, a running resistance coefficient, a vehicle weight, a gear ratio and a wheel radius are known, the regenerative torque can be determined. Namely, if $f$ is a certain function, the following relational expression can be established:

$$\text{Regenerative torque} = f(\text{Deceleration, Vehicle speed,}\\ \text{Running resistance coefficient, Vehicle weight,}\\ \text{Gear ratio, Wheel radius})$$

From the above relational expression, the 'first regenerative torque threshold value', which is a regenerative torque value corresponding to the 'first deceleration threshold value', can be determined if the first deceleration threshold value ($-1.3$ m/s) as a deceleration, a vehicle speed, a running resistance coefficient, a vehicle weight, a gear ratio and a wheel radius are known. In this way, the first deceleration threshold value ($-1.3$ m/s$^2$) can be converted to the first regenerative torque threshold value (Nm), which is a regenerative torque value at each vehicle speed.

Also, the 'second regenerative torque threshold value', which is a regenerative torque value corresponding to the 'second deceleration threshold value', can be determined if the second deceleration threshold value ($-0.7$ m/s$^2$) as a deceleration, a vehicle speed, a running resistance coefficient, a vehicle weight, a gear ratio and a wheel radius are known. In this way, the second deceleration threshold value ($-0.7$ m/s$^2$) can be converted to the second regenerative torque threshold value (Nm), which is a regenerative torque value at each vehicle speed.

As each data (running resistance coefficient and the like) used for converting the 'first deceleration threshold value' and the 'second deceleration threshold value' to the 'first regenerative torque threshold value' and the 'second regenerative torque threshold value', the employed data are as follows:

Deceleration ... the first deceleration threshold value ($-1.3$ m/s$^2$) or the second deceleration threshold value ($-0.7$ m/s$^2$), Vehicle speed ... a value calculated by a vehicle speed calculation unit 8 based on a wheel speed signal S2 obtained from a wheel speed sensor 7.

Running resistance coefficient ... a value previously measured by a test.

Vehicle weight ... a curb weight (CW) or a gross vehicle weight (GVW) defined by specifications.

Gear ratio ... a value defined by specifications.

Wheel radius ... a value defined by specifications.

Herein, the vehicle weight employs the curb weight, which corresponds to a minimum weight, and the gross vehicle weight, which corresponds to a maximum considering variations thereof due to passengers or burdens.

Figure 4:
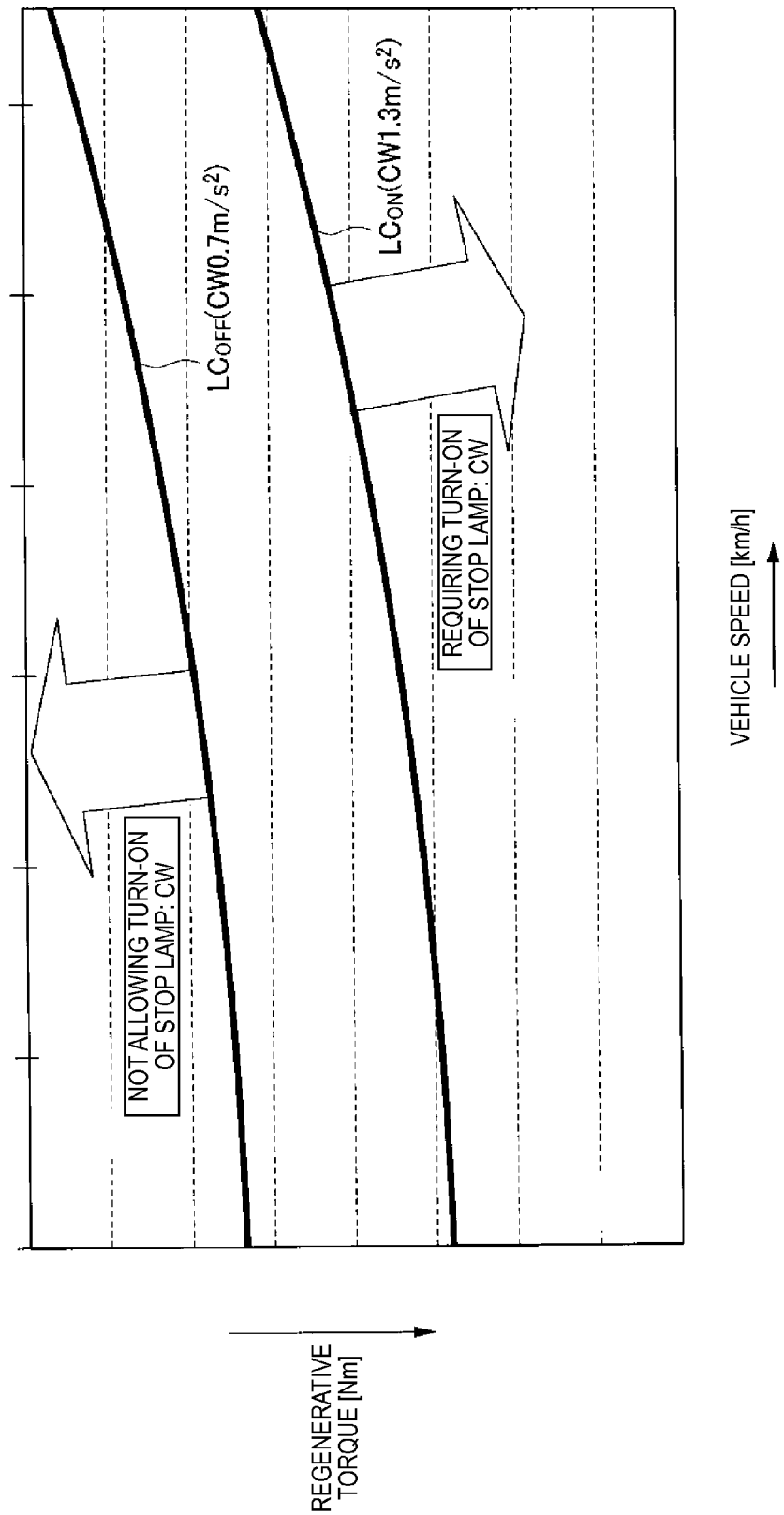
FIG. 4 is a characteristic diagram with a horizontal axis representing vehicle speeds and a vertical axis representing regenerative torques obtained by converting the regulation with the horizontal axis representing vehicle speeds and the vertical axis representing decelerations, using an empty vehicle weight.

FIG. 4 shows a data map in which the 'first deceleration threshold value' and the 'second deceleration threshold value' are converted to the 'first regenerative torque threshold value' and the 'second regenerative torque threshold value', using the curt weight (CW) as the vehicle weight and also considering vehicle speeds, the running resistance coefficient, the gear ratio and the wheel radius.

A stop lamp turn-on regenerative torque threshold value line $LC_{ON}$ shown in FIG. 4 is a line obtained by converting the first deceleration threshold value ($-1.3$ m/s$^2$) to the first regenerative torque threshold value (Nm) at each vehicle speed and then by continuously connecting the first regenerative torque threshold values (Nm). Also, a stop lamp turn-off regenerative torque threshold value line $LC_{OFF}$ shown in FIG. 4 is a line obtained by converting the second deceleration threshold value ($-0.7$ m/s$^2$) to the second regenerative torque threshold value (Nm) at each vehicle speed and then by continuously connecting the second regenerative torque threshold values (Nm).

The stop lamp turn-on regenerative torque threshold value line $LC_{ON}$ and the stop lamp turn-off regenerative torque threshold value line $LC_{OFF}$ are gradually decreased as the vehicle speed are increased. This reason is in that a running resistance determined from the vehicle speed and the running resistance coefficient is increased as the vehicle speed is increased.

Figure 5:
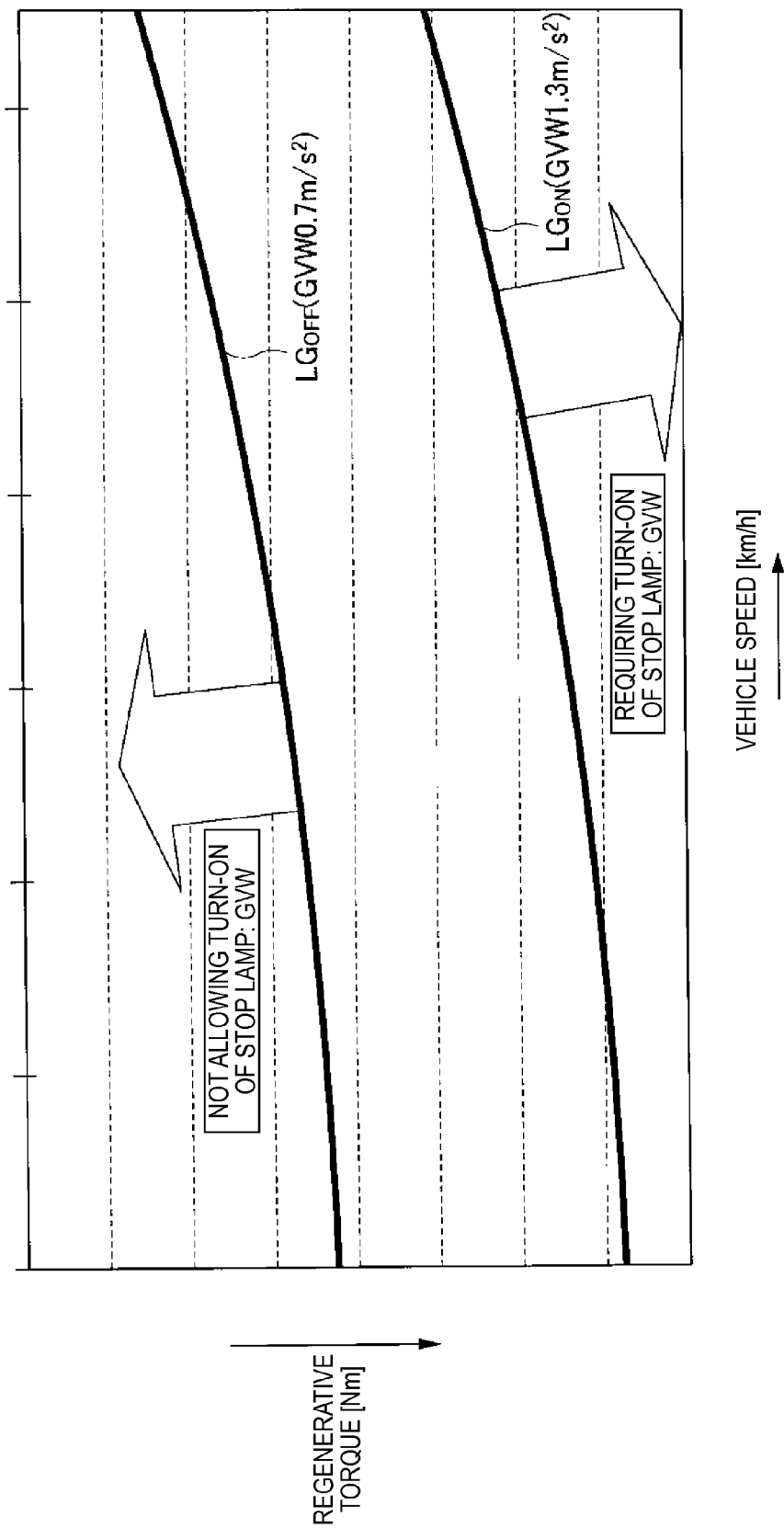
FIG. 5 is a characteristic diagram with a horizontal axis representing vehicle speeds and a vertical axis representing regenerative torques obtained by converting the regulation with the horizontal axis representing vehicle speeds and the vertical axis representing decelerations, using a total vehicle weight.

FIG. 5 shows a data map in which the 'first deceleration threshold value' and the 'second deceleration threshold value' are converted to the 'first regenerative torque threshold value' and the 'second regenerative torque threshold value', using the gross vehicle weight (GVW) as the vehicle weight and also considering vehicle speeds, the running resistance coefficient, the gear ratio and the wheel radius.

A stop lamp turn-on regenerative torque threshold value line $LG_{ON}$ shown in FIG. 5 is a line obtained by converting the first deceleration threshold value ($-1.3$ m/s$^2$) to the first regenerative torque threshold value (Nm) at each vehicle speed and then by continuously connecting the first regenerative torque threshold values (Nm). Also, a stop lamp turn-off regenerative torque threshold value line $LG_{OFF}$ shown in FIG. 5 is a line obtained by converting the second deceleration threshold value ($-0.7$ m/s$^2$) to the second regenerative torque threshold value (Nm) at each vehicle speed and then by continuously connecting the second regenerative torque threshold values (Nm).

The stop lamp turn-on regenerative torque threshold value line $LG_{ON}$ and the stop lamp turn-off regenerative torque threshold value line $LG_{OFF}$ are gradually decreased as the vehicle speed are increased. This reason is in that a running resistance determined from the vehicle speed and the running resistance coefficient is increased as the vehicle speed is increased.

Meanwhile, when the vehicle speed is v, the running resistance coefficients are a and b, and the running resistance is R, the running resistance R is calculated by the following equation:

$$R = a \times v^2 + b$$

Figure 6:
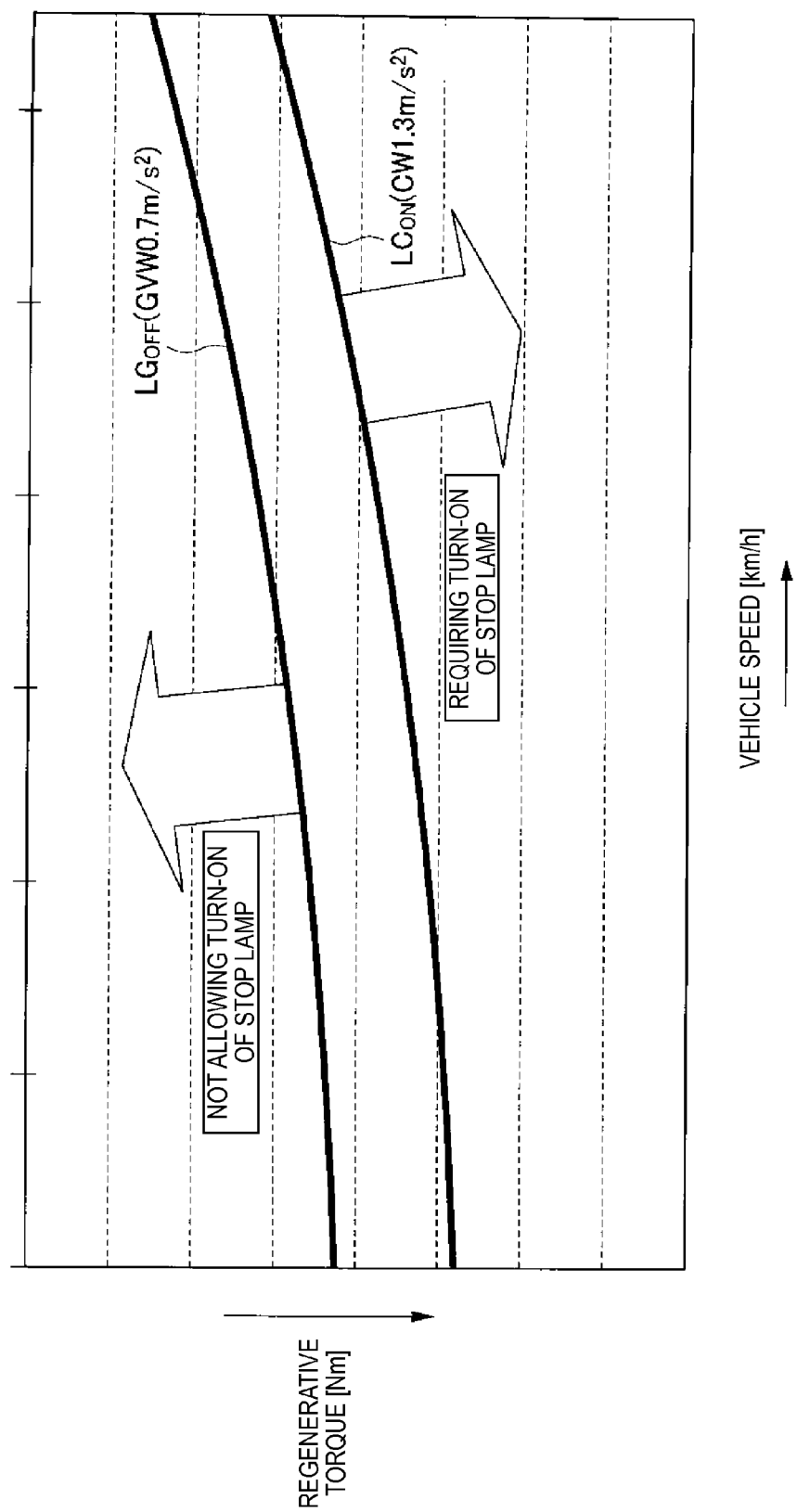
FIG. 6 is a characteristic diagram with a horizontal axis representing vehicle speeds and a vertical axis representing regenerative torques, corresponding to a data map used in the embodiment of the invention and also set to be capable of observing the notified regulation, regardless of a vehicle weight.

According to the present embodiment, as shown in FIG. 6, the stop lamp turn-on regenerative torque threshold value line $LC_{ON}$ converted using the curb weight (CW) is employed as a stop lamp turn-on regenerative torque threshold value line, and the stop lamp turn-off regenerative torque threshold value line $LG_{OFF}$ converted using the gross vehicle weight (GVW) is employed as a stop lamp turn-off regenerative torque threshold value line.

Namely, in the present embodiment, the stop lamp is controlled to be to on or turn off using the stop lamp turn-on regenerative torque threshold value line $LC_{ON}$ and the stop lamp turn-off regenerative torque threshold value line $LG_{OFF}$ shown in FIG. 6.

Giving to attention to two stop lamp turn-on regenerative torque threshold value lines shown in FIGS. 4 and 5, the stop lamp turn-on regenerative torque threshold value line $LC_{ON}$ is smaller than the stop lamp turn-on regenerative torque threshold value line $LG_{ON}$ and therefore, the smaller stop lamp turn-on regenerative torque threshold value line $LC_{ON}$ is employed in FIG. 6.

According to the present embodiment, when a regenerative torque exceeds the stop lamp turn-on regenerative torque threshold value line $LC_{ON}$, the stop lamp is controlled to be turned on. By doing so, even when the vehicle weight is the gross vehicle weight (GVW) as well as the curb weight (CW), namely, even when the vehicle weight is any vehicle weight falling in a range from the curb weight (CW) to the gross vehicle weight (GVW), the stop lamp can be appropriately turned on.

Giving to attention to two stop lamp turn-off regenerative torque threshold value lines shown in FIGS. 4 and 5, the stop lamp turn-off regenerative torque threshold value line $LG_{OFF}$ is larger than the stop lamp turn-off regenerative torque threshold value line $LC_{OFF}$ and therefore, the larger stop lamp turn-off regenerative torque threshold value line $LG_{OFF}$ is employed in FIG. 6.

According to the present embodiment, when a regenerative torque is equal to or smaller than the stop lamp turn-off regenerative torque threshold value line $LG_{OFF}$, the stop lamp is controlled to be turned off. By doing so, even when the vehicle weight is the curb weight (CW) as well as the gross vehicle weight (GVW), namely, even when the vehicle weight is any vehicle weight falling in a range from the gross vehicle weight (GVW) to the curb weight (CW), the stop lamp can be appropriately turned off.

<Specific Embodiments Employing the Control Principle>

Now, specific embodiments employing the control principle as described above will be described with reference to FIG. 1.

Figure 1:
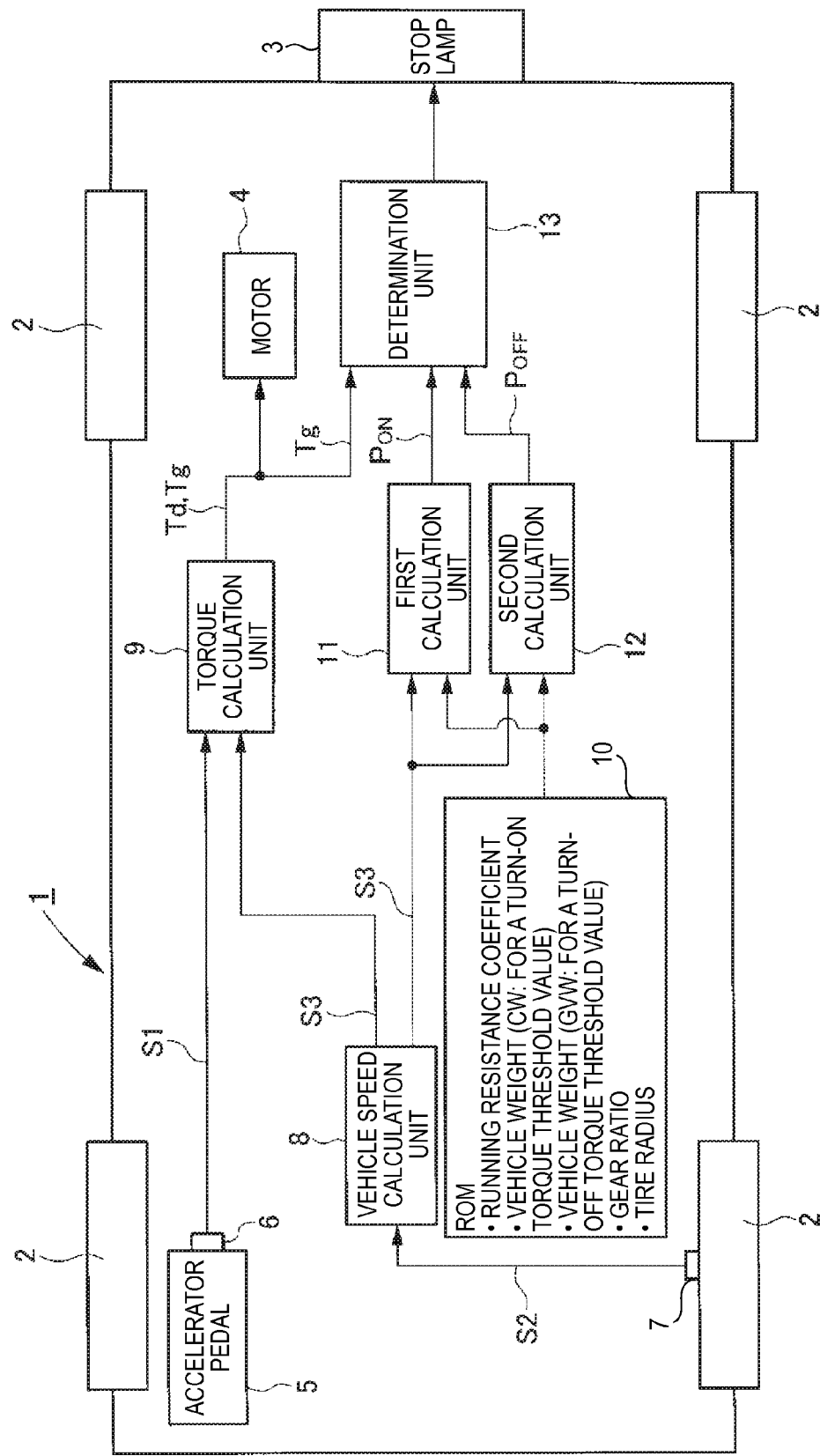
FIG. 1 is a block diagram showing a stop lamp lighting control device for an electric vehicle according to an embodiment of the present invention.

FIG. 1 shows an electric vehicle 1 in which the stop lamp lighting control device for the electric vehicle according to the present embodiment is mounted. The electric vehicle 1 has wheels 2, a stop lamp 3 and a driving motor 4.

An accelerator position sensor 6 is disposed on an accelerator pedal 5 and the accelerator position sensor 6 outputs an accelerator opening degree signal S1 representing an accelerator opening degree. A wheel speed sensor 7 is disposed on the wheel 2 and the wheel speed sensor 7 outputs a wheel speed signal S3 representing a wheel speed. A vehicle speed calculation unit 8 outputs a vehicle speed signal S3 representing a vehicle speed based on the wheel speed signal S2.

On the bases of the accelerator opening degree signal S1, the vehicle speed signal S3, or information, such as a shifting position signal from a shilling position sensor for detecting a shifting position of a shifting lever, not shown, a torque calculation unit (EV-ECU: vehicle integration unit) 9 outputs a required torque signal Td representing a required torque when the electric vehicle 1 is driven to run, and also outputs a regenerative torque signal Tg representing a regenerative torque during regenerative braking.

When the torque calculation unit 9 outputs the regenerative torque signal Tg, the accelerator opening degree represented by the accelerator opening degree signal S1 become a fully closed state, and the torque calculation unit 9 performs control for circuit switching required to perform regenerative braking.

When receiving the required torque signal Td, the motor 4 is operated to generate the required torque represented by the required torque signal Td, and a driving force of the motor 4 is transmitted to the wheels 2 via a transmission mechanism, such as gears. Thus, the electric vehicle 1 is driven to run.

If receiving the regenerative torque signal Tg, the motor 4 performs power generation braking to generate the regenerative torque represented by the regenerative torque signal Tg and exerts a braking force on the wheels 2.

A system configuration in which the torque calculation unit 9 outputs the regenerative torque signal Tg and thus the motor 4 performs regenerative braking corresponds to the 'electric regenerative braking system'.

In a memory unit (ROM) 10, the following predetermined data values are stored.
Running resistance coefficient to value previously measured by a test)
Curb weight (CW defined by specifications)
Gross vehicle weight (GVW defined by specifications)
Gear ratio (a value defined by specifications)
Wheel radius (a value defined by specifications)

In a first calculation unit 11, the first deceleration threshold value ($-1.3$ m/s$^2$) is previously set. The first calculation unit 11 calculates and outputs, at every predetermined specific clocks, a first regenerative torque threshold value $P_{ON}$ at a vehicle speed represented by the vehicle speed signal S3 at each clock, using the first deceleration threshold value ($-1.3$ m/s$^2$), the vehicle speed represented by the vehicle speed signal S3, and the running resistance coefficient, the curb weight (CW), the gear ratio and the wheel radius stored in the memory unit 10.

The first regenerative torque threshold value $P_{ON}$ calculated in this way is a value on the stop lamp turn-on regenerative torque threshold value line $LC_{ON}$ shown in FIG. 6 and represents a regenerative torque value (vertical axis in FIG. 6) required to generate a certain deceleration as a function of a vehicle speed (horizontal axis in FIG. 6) at a time of calculation.

In a second calculation unit 12, the second deceleration threshold value ($-0.7$ m/s$^2$) is previously set. The second calculation unit 12 calculates and outputs, at every predetermined specific clocks, a second regenerative torque threshold value $P_{OFF}$ at a vehicle speed represented by the vehicle speed signal S3 at each clock, using the second deceleration threshold value ($-0.7$ m/s$^2$), the vehicle speed represented by the vehicle speed signal S3, and the running resistance coefficient, the gross vehicle weight (GVW), the gear ratio and the wheel radius stored in the memory unit 10.

The second regenerative torque threshold value $P_{OFF}$ calculated in this way is a value on the stop lamp turn-off regenerative torque threshold value line $LG_{OFF}$ shown in FIG. 6 and represents a regenerative torque value (vertical axis in FIG. 6) required to generate a certain deceleration as a function of a vehicle speed (horizontal axis in FIG. 6) at a time of calculation.

A determination unit 13 receives, at every predetermined specific clocks, the regenerative torque signal Tg outputted from the torque calculation unit 9 and also receives, at every predetermined specific clocks, the first regenerative torque threshold value $P_{ON}$ outputted from the first calculation unit 11, the second regenerative torque threshold value $P_{OFF}$ outputted from the second calculation unit 12. Thus, the determination unit 13 performs, at every predetermined specific clocks, comparison determination between a regenerative torque value represented by the regenerative torque signal Tg and the first regenerative torque threshold value $P_{ON}$, the second regenerative torque threshold value $P_{OFF}$ received thereto.

Meanwhile, the specific clocks in the determination unit 13 is synchronized with the specific clocks in the first calculation unit 11, the specific clocks in the second calculation unit 12.

The determination unit 13 performs control for firming on the stop lamp 3 when the regenerative torque value represented by the regenerative torque signal Tg exceeds the first regenerative torque threshold value $P_{ON}$.

Also, the determination unit 13 performs control for turning off the stop lamp 3 when the regenerative torque value represented by the regenerative torque signal Tg is equal to or smaller than the second regenerative torque threshold value $P_{OFF}$.

Further, the determination unit 13 performs control for keeping a previous state of the stop lamp 3 when the regenerative torque value represented by the regenerative torque signal Tg is equal to or smaller than the first regenerative torque threshold value $P_{ON}$ and the regenerative torque value represented by the regenerative torque signal Tg is larger than the second regenerative torque threshold value $P_{OFF}$.

For example, when the regenerative torque value represented by the regenerative torque signal Tg is changed in such a manner that the regenerative torque value represented by the regenerative torque signal Tg exceeds the first regenerative torque threshold value $P_{ON}$ to turn on the stop lamp 3 and then is again decreased to be equal to or smaller than the first regenerative torque threshold value $P_{ON}$, the turn-on state of the stop lamp 3 is kept.

Also, in a state where the regenerative torque value represented by the regenerative torque signal Tg exceeds the first regenerative torque threshold value $P_{ON}$ and thus the stop lamp 3 is turned on, when the regenerative torque value represented by the regenerative torque signal Tg is changed in such a manner that the regenerative torque value represented by the regenerative torque signal Tg becomes equal to or smaller than the second regenerative torque threshold value $P_{OFF}$ to turn of the stop lamp 3 and then is again increased to exceed the second regenerative torque threshold value $P_{OFF}$, the turn-off state of the stop lamp 3 is kept.

In this way, by performing such calculation controls at every predetermined specific clocks, regardless of the vehicle weight and also even at any vehicle speeds, the determination unit 13 causes:

the stop lamp 3 to be turned on when the regenerative torque value represented by the regenerative torque signal Tg exceeds the stop lamp turn-on regenerative torque threshold value line $LC_{ON}$ shown in FIG. 6;

the stop lamp 3 to be turned of when the regenerative torque value represented by the regenerative torque signal Tg is equal to or smaller than the stop lamp turn-off regenerative torque threshold value line $LG_{OFF}$ shown in FIG. 6; and the stop lamp 3 to be kept in a previous state thereof when the regenerative torque value represented by the regenerative torque signal Tg is equal to or smaller than the stop lamp turn-on regenerative torque threshold value line $LC_{ON}$ and the regenerative torque value represented by the regenerative torque signal Tg is larger than the stop lamp turn-off regenerative torque threshold value line $LG_{OFF}$ shown in FIG. 6.

A system configuration in which the vehicle speed calculation unit 8, the torque calculation unit 9, the memory unit 10, the first calculation runt 11, the second calculation unit 12 and the determination unit 13 as described above are cooperated to perform comparison determination between the regenerative torque value represented by the regenerative torque signal Tg and the first regenerative torque threshold value $P_{ON}$ and the second regenerative torque threshold value $P_{OFF}$ as described above, and according to the results of comparison determination, the stop lamp 3 is controlled to be turned on or off, corresponds to the 'stop lamp lighting control device for the electric vehicle'.

Figure 2:
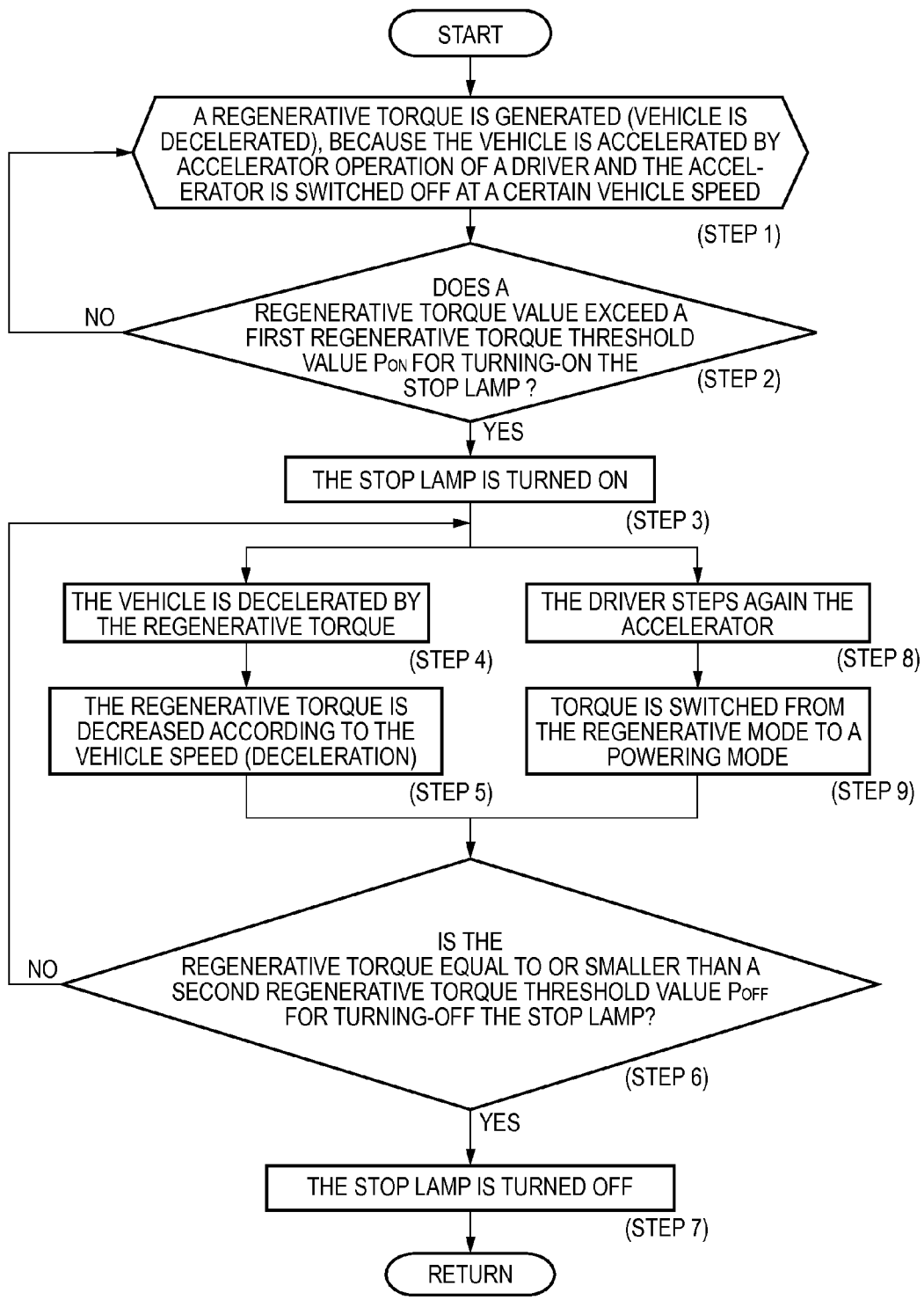
FIG. 2 is a flow chart showing a procedure for controlling the stop lamp lighting control device for the electric vehicle according to the embodiment of the invention.

Next, a control procedure in the determination unit 13 will be described with reference to FIG. 2, which is a flow chart showing the control procedure.

After a vehicle (electric vehicle 1) is accelerated by accelerator operation of a driver, if the accelerator is switched OFF at a certain vehicle speed, the electric regenerative braking system is activated to generate a regenerative torque, and thus the vehicle is decelerated (step 1).

At this time, whether or not the regenerative torque value exceeds the first regenerative torque threshold value $P_{ON}$ is determined (step 2). Herein, the first regenerative torque threshold value $P_{ON}$ is calculated by converting the first deceleration threshold value ($-1.3$ m/s$^2$) assumed that the vehicle weight is a curb weight.

In the step 2, if the regenerative torque value exceeds the first regenerative torque threshold value $P_{ON}$, the stop lamp is turned on (step 3).

In the step 3, if the regenerative torque value does not exceed the first regenerative torque threshold value $P_{ON}$, the procedure returns to the step 1.

After the step 3, as the electric regenerative braking system is activated to generate a regenerative torque, the vehicle is decelerated (step 4).

As the vehicle is decelerated, the regenerative torque is decreased (step 5).

After the step 5, whether or not the regenerative torque value is smaller than the second regenerative torque threshold value $P_{OFF}$ is determined (step 6). Herein, the second regenerative torque threshold value $P_{OFF}$ is calculated by converting the second deceleration threshold value ($-0.7$ m/s$^2$), assumed that the vehicle weight is a gross vehicle weight.

In the step 6, if the regenerative torque value is smaller than the second regenerative torque threshold value $P_{OFF}$, the stop lamp 3 is turned off (step 7).

In the step 6, if the regenerative torque value is not smaller than the second regenerative torque threshold value $P_{OFF}$, the procedure returns to the step 4 or a step 8.

After the step 3, or when the logic of the step 6 is false, if the driver steps again the accelerator (step 8), the torque is switched from the regenerative mode to a powering mode (step 9).

After the step 9, the procedure proceeds to the determination in the step 6 and whether or not the regenerative torque value is smaller than the second regenerative torque threshold value $P_{OFF}$ is determined. If the regenerative torque value is equal to or smaller than the second regenerative torque threshold value $P_{OFF}$, the stop lamp 3 is turned off (step 7). If the regenerative torque value is not equal to or smaller than the second regenerative torque threshold value $P_{OFF}$, the procedure returns to step 4 or step 8

Meanwhile, the present invention is not limited to the foregoing embodiment and accordingly may be variously modified without departing from the scope of the invention.

For example, although in the foregoing embodiment, the second deceleration threshold value of $-0.7$ m/s$^2$ and the first deceleration threshold value of $-1.3$ m/s$^2$ have been described, the values may be changed depending upon applications thereof.

INDUSTRIAL APPLICABILITY

The present, invention can be applied to turn-on or turn-off control of brake lamps (stop lamps) of electric vehicles, such as hybrid vehicles or plug-in hybrid vehicles having an electric regenerative braking system, in addition to electric vehicles having an electric regenerative braking system.

What is claimed is:

1. A stop lamp lighting control device for an electric vehicle having an electric regenerative braking system, comprising:

a calculation unit that converts a previously-defined first deceleration threshold value for turning on a stop lamp or a previously-defined second deceleration threshold value for turning off the stop lamp to a first regenerative torque threshold value for turning-on the stop lamp or a second regenerative torque threshold value for turning-off the stop lamp at each vehicle speed by calculation assumed that a weight of the electric vehicle is a curb weight or a gross vehicle weight; and a determination unit that performs a comparison between a regenerative torque value generated by the electric regenerative braking system during a regenerative braking and the first regenerative torque threshold value or the second regenerative torque threshold value at each vehicle speed and turns on or turns off the stop lamp based on the comparison result.

2. The stop lamp lighting control device according to claim 1, wherein the calculation unit includes:

a first calculation unit that converts the first deceleration threshold value to the first regenerative torque threshold value at each vehicle speed by calculation assumed that the weight of the electric vehicle is the curb weight; and a second calculation unit that converts the second deceleration threshold value to the second regenerative torque threshold value at each vehicle speed by calculation assumed that the weight of the electric vehicle is the gross vehicle weight, wherein the determination unit turns on the stop lamp when the regenerative torque value is larger than the first regenerative torque threshold value, and wherein the determination unit turns off the stop lamp when the regenerative torque value is equal to or smaller than the stop lamp turn-off regenerative torque threshold value.

3. The stop lamp lighting control device for an electric vehicle according to claim 1, wherein the determination unit is configured:

to keep the stop lamp turned on when the regenerative torque value becomes equal to or smaller than the first regenerative torque threshold value while the stop lamp is at a turned on state; and to keep the stop lamp turned off when the regenerative torque value exceeds the second regenerative torque threshold value while the stop lamp is at a turned off state.

4. The stop lamp lighting control device for an electric vehicle according to claim 2, wherein the determination unit is configured:
  to keep the stop lamp turned on when the regenerative torque value becomes equal to or smaller than the first regenerative torque threshold value while the stop lamp is at a turned on state; and
  to keep the stop lamp turned off when the regenerative torque value exceeds the second regenerative torque threshold value while the stop lamp is at a turned off state.

* * * * *